Oct. 20, 1959 J. GARDBERG 2,909,605

DISTORTION SIGNAL GENERATOR

Filed Nov. 27, 1956 6 Sheets-Sheet 1

FIG. I

INVENTOR
JOSEPH GARDBERG

BY Emery Robinson
ATTORNEY

Oct. 20, 1959 J. GARDBERG 2,909,605

DISTORTION SIGNAL GENERATOR

Filed Nov. 27, 1956 6 Sheets-Sheet 2

INVENTOR
JOSEPH GARDBERG

BY Emery Robinson
ATTORNEY

INVENTOR
JOSEPH GARDBERG
BY Emery Robinson
ATTORNEY

DISTORTION SIGNAL GENERATOR

Filed Nov. 27, 1956 6 Sheets-Sheet 4

INVENTOR
JOSEPH GARDBERG
BY Emery Robinson
ATTORNEY

INVENTOR
JOSEPH GARDBERG
BY Emery Robinson
ATTORNEY

DISTORTION SIGNAL GENERATOR

Filed Nov. 27, 1956 6 Sheets-Sheet 6

INVENTOR
JOSEPH GARDBERG
BY Emery Robinson
ATTORNEY

United States Patent Office 2,909,605 Patented Oct. 20, 1959

2,909,605

DISTORTION SIGNAL GENERATOR

Joseph Gardberg, Chicago, Ill., assignor to Teletype Corporation, Chicago, Ill., a corporation of Delaware Application November 27, 1956, Serial No. 624,660

12 Claims. (Cl. 178—69)

Figure 1:
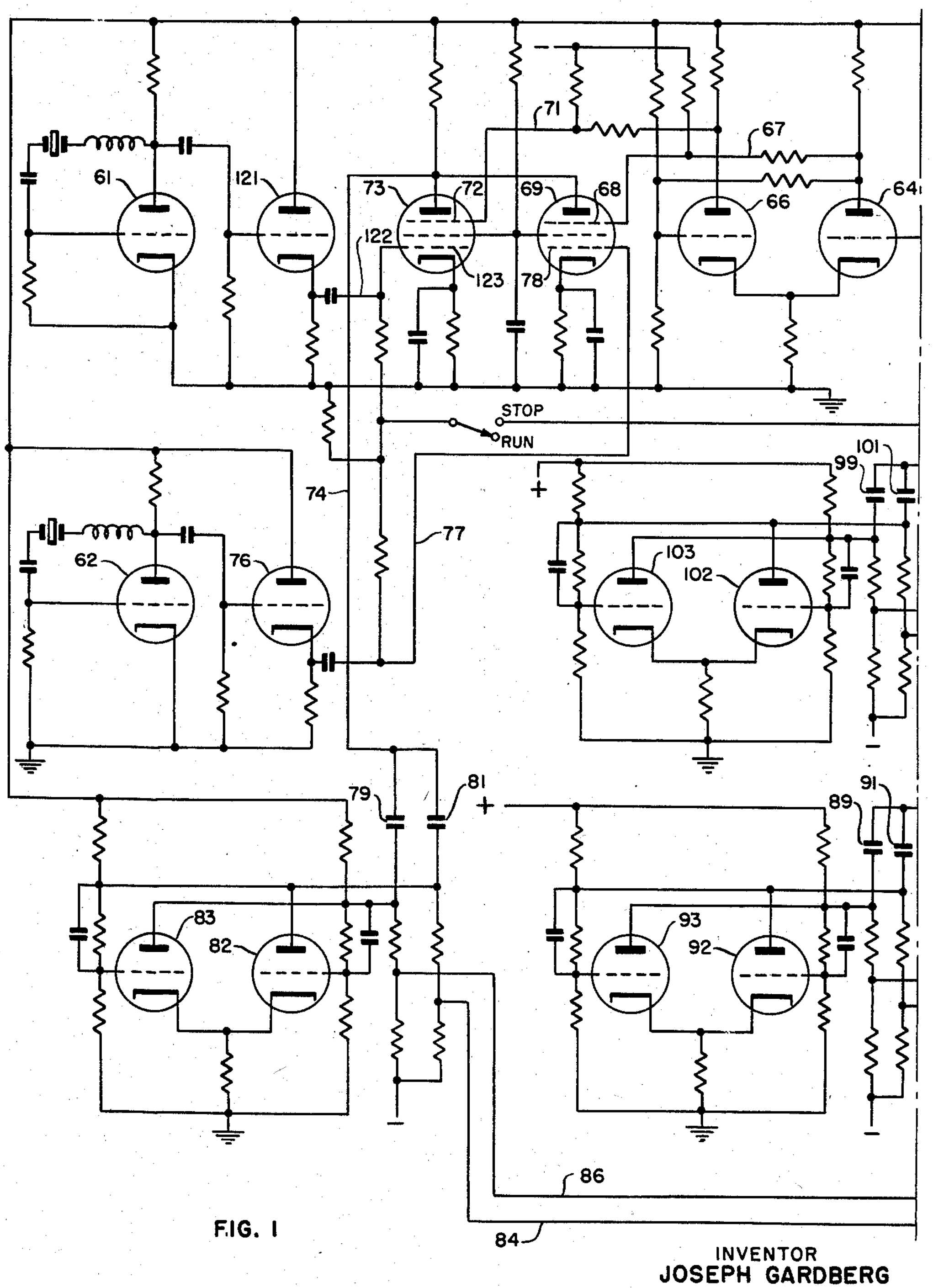
Figure 2:
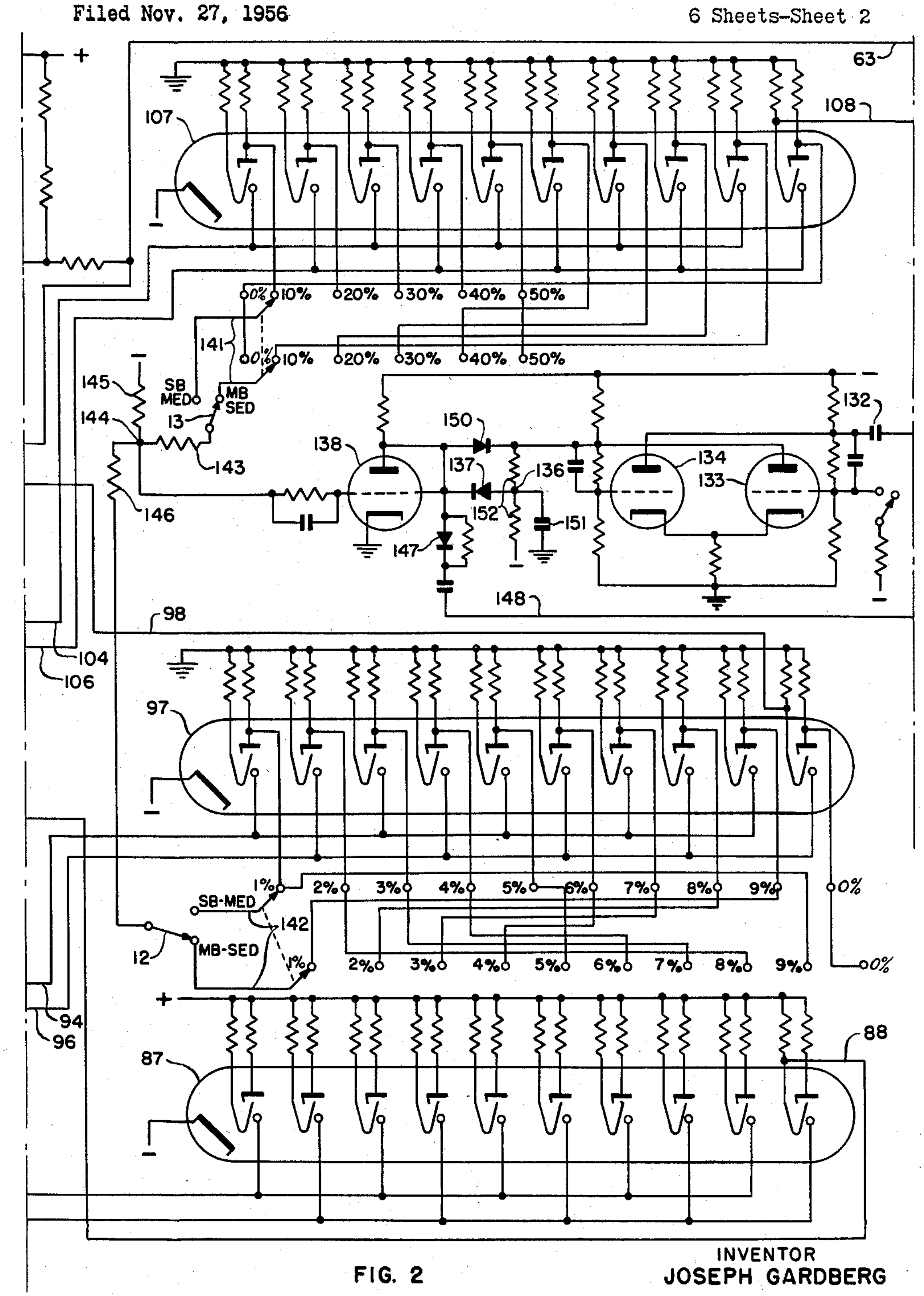

This invention relates to a distortion signal generator and more particularly to a digital counter system for operating a signal generator to produce telegraph signals having predetermined amounts of distortion.

In the maintenance and inspection of telegraph systems and apparatus, it is often necessary to verify the performance of the various components in response to receipt of signals having predetermined amounts of distortion therein. Each component apparatus must be capable of performing its designated functions upon receipt of signals that may have been distorted in the signal originating means or in the transmission medium. In practice, it is usually required that the component apparatus correctly function in response to signals having either marking bias, spacing bias, spacing end distortion or marking end distortion, or any combination thereof.

By "marking bias" it is meant that the space-to-mark transition of each marking pulse in a start-stop telegraph signal has been advanced with respect to the normal mark-to-space transition occurring at the beginning of the generation of each start impulse. In a like manner, the term "spacing bias" designates a condition wherein the space-to-mark transition of each marking pulse is retarded with respect to the normal space-to-mark transition. The term "marking end distortion" refers to a condition where the normal mark-to-space transition of each marking pulse in a signal is retarded with respect to the initiation of the start impulse. Conversely, the term "spacing end distortion" indicates a condition wherein the normal mark-to-space transition of each marking pulse in a signal is advanced with respect to the initiation of the start impulse. The mark-to-space transition of the stop pulse is the beginning of the start pulse, the reference point of all transmissions, and should not be effected.

In present day communication systems utilizing high speed components, it is necessary, in performing checking operations, that a distortion signal generator be provided to produce high speed signals at various fixed rates at which the various components are susceptible of operation. Further, in order to evaluate testing procedures properly, it is required that signals be generated with precise percentages of various types of distortion.

It is a primary object of this invention to produce a distortion signal generator capable of generating telegraph signals with precise increments of distortion therein.

It is a further object of the invention to provide a distortion signal generator having facilities therein for the expeditious changing of the amounts of distortion imparted to each generated signal impulse.

Another object of the invention resides in a pair of oscillator circuits that are selectively rendered effective to drive a series of frequency dividers that in turn drive a start-stop distortion signal generator.

A more finite object of the invention resides in a gating circuit that is under the joint control of one or more of a series of frequency dividers and the operation of a signal impulse distributor to produce a series of signals having predetermined types of distortion.

With these and other objects in view, a distortion signal generator embodying the invention may include a first network for sensing a first portion of a signal to be generated, a second network for sensing a succeeding portion of the signal to be generated after the first portion, counter means and means activated by a predetermined one of the outputs of the networks and the counter means output for introducing a predetermined distortion in the first portion.

More specifically, the present invention contemplates a multi-stage signal distributor driven by a train of pulses from a series of three serially-connected frequency dividers. Outputs from the signal distributor stages are combined with signal conditions from a suitable source to control an output mixer circuit that applies start-stop telegraph signals on an output line. The frequency dividers are driven by a first oscillator circuit to produce the start and the intelligence impulses in each signal. Facilities are provided to block this first oscillator circuit automatically and to render effective a second oscillator circuit upon an operation of a stop stage in the signal distributor. The period of operation of the second oscillator circuit is greater than that of the first, so that a prolonged stop pulse is generated to accompany each generated signal.

Distortion may be introduced into each generated intelligence signal impulse by means of a pair of gating circuits associated with each stage of the distributor. A first gating circuit of each pair is associated with each signal condition to be generated, whereas the other gating circuit is associated with the signal condition next to be generated. Outputs from these gating circuits are utilized to condition a coincidence circuit, which is actuated by outputs from the frequency dividers to establish the distortion transition in each generated intelligence signal impulse.

As an illustrative example, if it is desired to generate signals having marking bias and the first intelligence impulse is a marking impulse, then, during the generation of the start impulse, the second gating circuit associated with the start stage of the distributor will function to condition the coincidence circuit for operation. Depending upon the degree of distortion desired, outputs from the two frequency dividers are tapped off to actuate the coincidence circuit during the operation of the start stage in the signal distributor. Actuation of this circuit effectuates an operation of a mixer circuit to impart a space-to-mark transition on the output line. This condition is maintained on the output line for the remainder of the operation of the start stage of the distributor and for the entire time that the first signal stage of the distributor is in operation. The marking condition will be maintained on the output line until such time as a spacing signal condition is associated with an operative stage of the signal distributor, whereupon instrumentalities are actuated to operate the mixer circuit to impress a spacing condition on the output line.

Simple switching arrangements are provided to vary the degree of distortion imparted to each signal impulse. In addition, other switch facilities are provided to make simple changes in the circuit so that the signal generator produces signals having other, preselected types of distortion therein.

Figure 5:
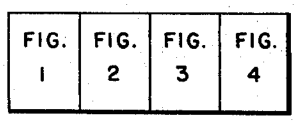

Other objects and advantages of the present invention will be apparent from the following detailed description, when considered in conjunction with the accompanying drawings, wherein:

Figs. 1, 2, 3 and 4, when assembled in the manner depicted in Fig. 5, illustrate the circuits required to produce a distortion signal generator in accordance with the principles of the present invention; and Figs. 6, 7, 8 and 9 are timing diagrams showing potential conditions existing on several of the various components of the circuit shown in Figs. 1 to 4, inclusive, during the time that the distorted signals are being generated and transmitted.

*Marking bias*

It is believed that the operation and construction of the individual components may be readily comprehended by a detailed description of the signal generator shown in Figs. 1 to 4, inclusive, when connected as a generator of signals having each and every marking intelligence signal impulse characterized with marking bias. The signal generator is first conditioned by moving a switch 10 (Fig. 4) to a marking bias position designated "MB." A switch 11 is moved to its "Bias" position, and a pair of switches 12 and 13 (Fig. 2) are moved to the positions designated by the letters "MB–SED." A switch 14 (Fig. 4) is also moved to a position marked "Bias." With these preparatory operations completed, the signal generator is now in condition to generate signals having marking bias.

Figure 3:
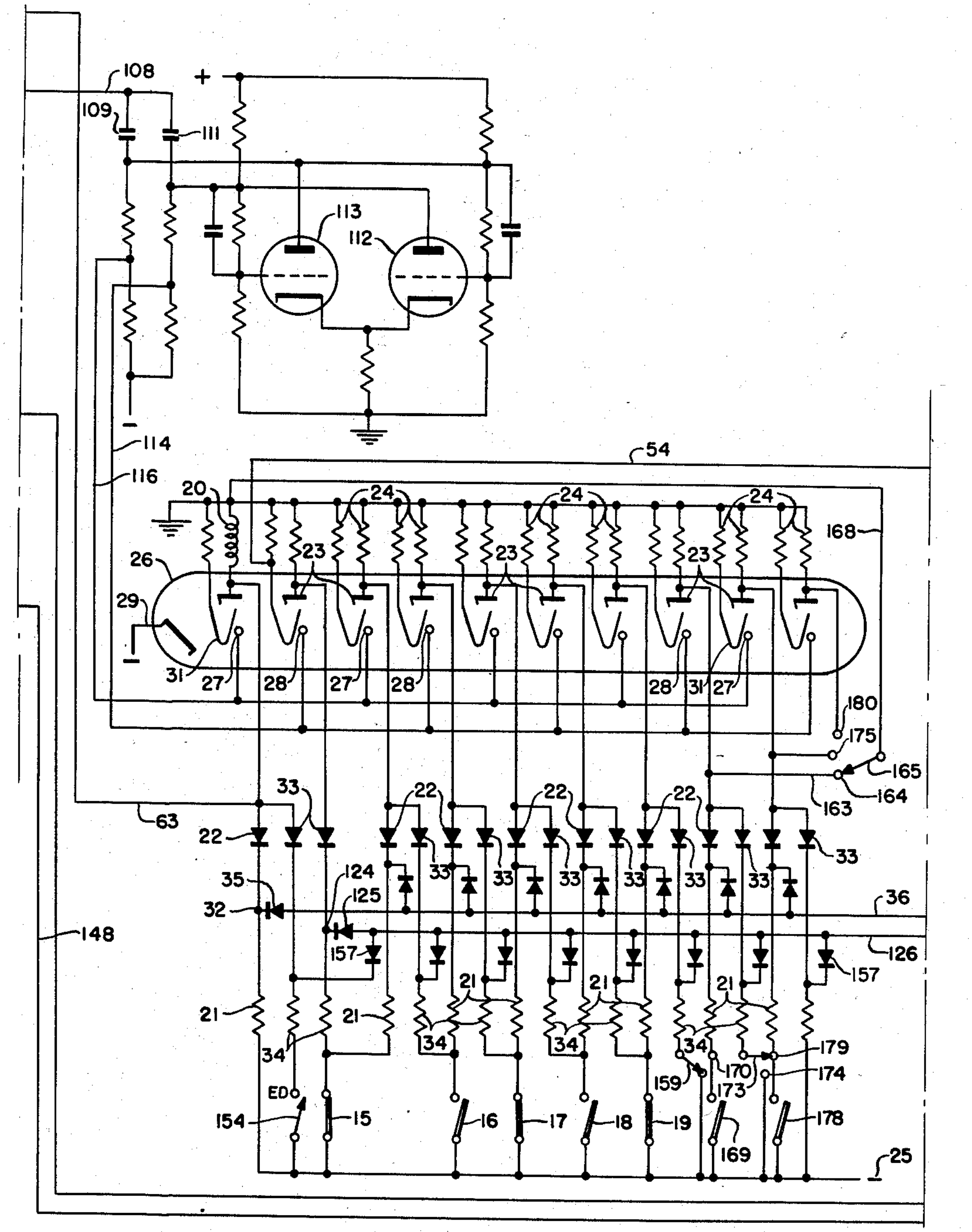
Figure 4:
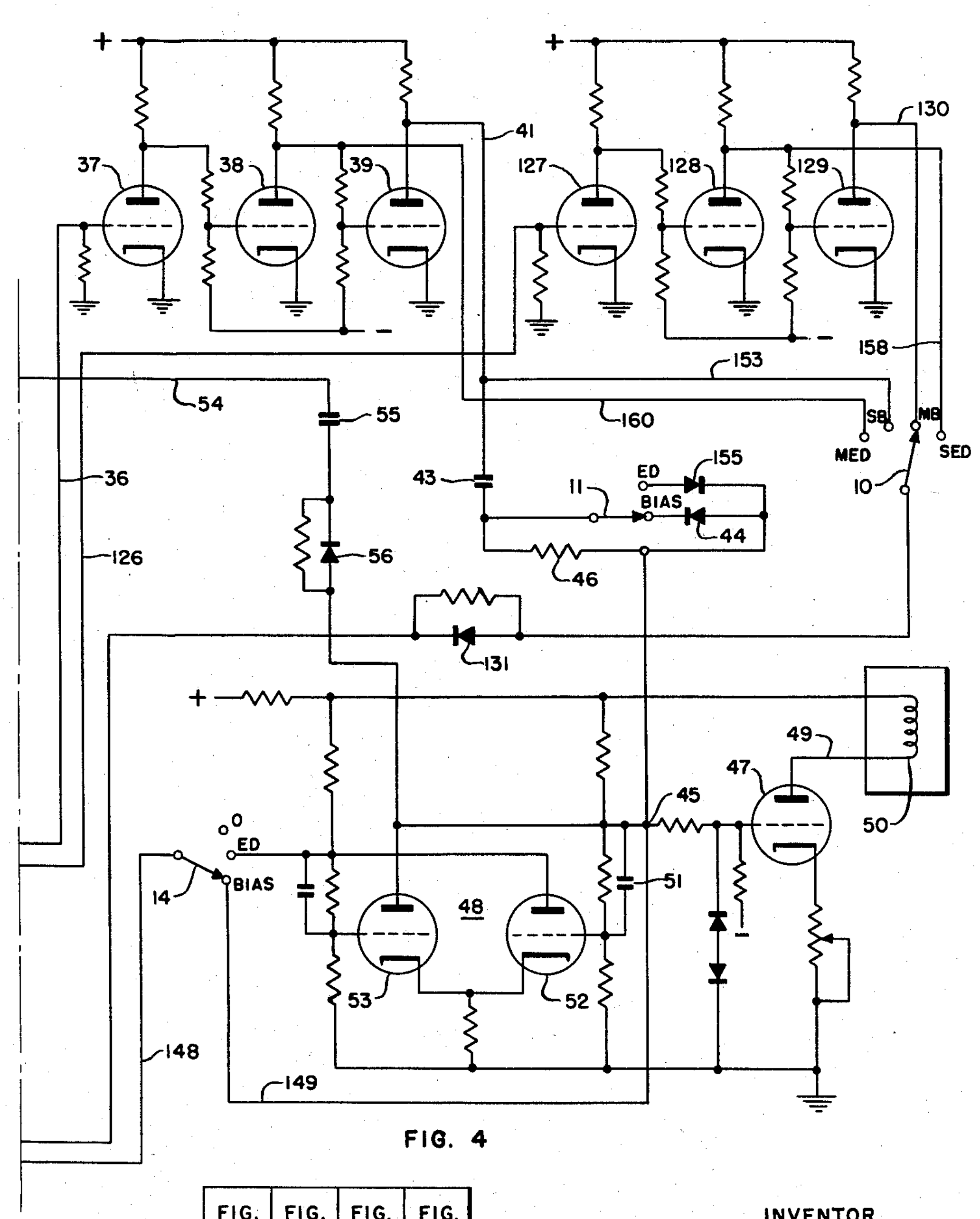

Referring to Fig. 3, there is shown a number of contacts 15, 16, 17, 18 and 19 that form part of a telegraph tape reader of a well-known type. These contacts are positioned selectively in accordance with five transverse rows of permutatively-arranged perforations formed in a message tape. In addition, the tape reader is represented by a feed magnet 20, which functions to control the advance of each new row of perforations to the sensing position following transmission of each signal. Facilities are provided to energize this magnet 20 during the period that a stop impulse is being generated. For purposes of illustration to be used hereinafter, assume that contacts 15, 17 and 19 have been closed in response to the actuation of the sensing means as shown in Fig. 3. This permutative closure of the contacts is indicative of signal representing the letter "Y" in accordance with the well-known five unit Baudot code. Codes having more than five units can be generated with the signal generator embodying the invention, as will be described more fully hereinafter.

Each of the contacts 15 to 19, inclusive, is connected in a circuit including a resistor 21 and a diode 22. These circuits terminate on one side in connections at a series of targets 23—23 that are in turn connected through a series of resistors 24—24 to a source of ground potential. The other side of the contacts 15 to 19, inclusive, are connected together and to a source of negative battery 25. The targets 23—23 are positioned in and form elements of a magnetron-type beam switching distributor tube 26. The tube 26 has a first set of control grids 27—27 and a second set of control grids 28—28 both of which sets are utilized to effect the successive stepping of a conductive electron path between a common cathode 29 and individual ones of the series of targets 23—23. Whenever a conductive path is established between a target 23 and the cathode 29, the lowering of the potential of an associated control grid 27—27 or 28—28 results in a transfer of the conductive path to the next succeeding target. A conductive path will be "locked" in a stage by an associated one of a group of spades 31—31 until such time as the associated grid potential is lowered to disturb the electric field, whereupon another switching operation occurs.

Assume that the last signal impulse of the previously-transmitted signal was a spacing or no-current impulse. Then, when the left-hand or stop stage of the tube 26 is rendered conductive, there is a drop in the potential of the left-hand target 23, which results in a drop in potential on a junction point 32. Junction point 32 was previously at ground potential due to a circuit running from ground through the feed magnet 20 associated with the left-hand target 23 in the stop stage of tube 26, through the diode 22 associated with the stop stage, the junction point 32 and the resistor 21 associated therewith, to the source of negative potential 25. This situation did not exist from the target 23 through a diode 33 and a resistor 34 to the source 25 of negative potential because an open circuit exists at this time between the resistor 34 and the negative source 25, as will be described more fully hereinafter. Obtaining ground potential at the junction point 32 or any similar point can be obtained easily if the resistance of the resistors 21 and 34 is very large, for example, one hundred times as large, with respect to that of the feed magnet 20. The same applies for other stages where the resistors 21—21 and 34—34 are made one hundred times as large as the resistors 24—24.

When the electric beam is established in the stop stage and the potential on the target 23 drops, the circuitry is so designed that this drop in potential exceeds that of the negative battery 25. Therefore, the diode 22 is cut off and, as a result thereof, the potential at the junction point 32 drops toward a value established by the source 25 of negative potential, as stated hereinabove. This drop in potential is reflected through a diode 35 and over a lead 36 to the grid circuit of a conducting buffer amplifier tube 37. The tube 37 assumes a nonconductive condition, whereupon its anode potential rises to impress an increase of potential on the grid of a voltage amplifier tube 38. Conduction of the tube 38 follows, and as a result, its anode potential drops to impress a decreased condition on the control grid of a conducting phase inverter tube 39. The anode potential of the tube 39 thereupon rises to impress an increased potential over a lead 41 to a differentiating capacitor 43, whereupon a differentiated, positive voltage pulse or spike is developed. A diode 44 is connected between the switch 11 and a junction point 45, which is at a lower potential condition in comparison to the positive pulse coming from the condenser 43. As a consequence, the positive pulse cannot pass the diode 44 and is ineffective. Further, the positive pulse cannot pass an extremely high resistor 46 paralleling the diode 44, the function of which is merely to discharge the capacitor 43.

Assume, now, that during the generation of the preceding signal, the intelligence impulse was a spacing impulse. Then, facilities embodying the present invention are operated to initiate the generation of a marking condition to be associated with the stop impulse. This feature of the invention is accomplished by raising the potential of the junction point 45 while the last or number five impulse stage of the signal distributor is operating. When the positive pulse appears at junction point 45 two functions are performed, namely, the rendering conductive of an output tube 47 and the effectuation of operation of an output mixer bistable flip-flop circuit 48. Upon tube 47 becoming conductive, a circuit is established running over an output transmission lead 49 to a selector magnet 50. The selector magnet 50 is included in an apparatus that is to be tested by the distorted signals.

The increased potential at junction point 45 was also impressed through a capacitor 51 to the control grid of a right-hand triode 52 of the output mixer circuit 48. Since this is a flip-flop circuit, the triode 52 is rendered conductive and a second triode 53 is thereby placed in a nonconductive state. The anode of the triode 53 is connected to the control grid of the output tube 47, and when this tube 53 is rendered nonconductive, the accompanying rise in anode potential is utilized to hold the tube 47 in the conductive state. The conducting condition of the tube 47 is maintained not only for the duration of the remainder of the generation of the last impulse of the preceding signal, but also during the entire period that the stop stage of the distributor tube 26 is operating.

When the stop stage of the distributor tube 26 is shut off and the next succeeding or start stage is rendered conducting, the potential of the target 23 in the stop stage increases to ground potential since the resistance of the feed magnet coil 20 is negligible, as described hereinabove. The diode 22 will assume conduction, and, since the resistance of resistor 34 is very high with respect to that of the feed magnet coil 20, the potential of the junction point 32 becomes that of essentially ground potential. Consequently, the potential on the lead 36 increases from its former negative value, and this increased potential is applied to the grid of the tube 37, thereby driving the tube 37 into a state of heavy conduction. This action is followed by the rendering of tube 38 nonconductive and the rendering of the tube 39 conducting. The accompanying drop in anode potential of tube 39 is applied by the lead 41 to the diode 44 which will allow this negative potential to pass. The potential at the junction point 45 will then drop to a low value. The tube 47 will now shut off, and the output mixer circuit 48 will be operated to maintain the tube 47 in its shut off condition. The tube 47 should remain shut for the entire time that the associated stage of the tube 26 is conducting if no other factors affected the potential of the junction point 45.

The initiation of the start impulse is also facilitated by another circuit which, in the present embodiment of the signal generator, supplements the action described in the preceding paragraph. This circuit includes a lead 54 connected to the spade 31 in the start stage of the tube 26 (the second spade 31 from the left) so that when the start stage is rendered conductive the drop in the spade potential is reflected over the lead 54, through a capacitor 55 and diode 56, to the junction point 45. Appearance of this decreased potential at the junction point 45 also acts to drive the tube 47 into a nonconductive state, thereby furthering the shut off condition of tube 47 to impress the no-current or spacing condition on the lead 49, which is indicative of the initiation of a start impulse. This drop in potential at the junction point 45 is also impressed through the differentiating capacitor 51 to further the shutting off of the tube 52. As a result, the action on tube 53 is also accelerated to place this tube in a conducting condition, whereupon its anode potential drops to hold the tube 47 cut off. The negative potential impressed over the lead 54 has an effect only when end distortion is to be generated, and it is provided to prevent end distortion of the stop pulse. It is described here since it is applied to the junction point 45 each time the start stage of the distributor tube 26 conducts.

Considering now the means for applying negative drive pulses to the control grids 27—27 and 28—28 of the signal impulse distributor tube 26, there is shown in the upper left-hand portion of Fig. 1 a pair of crystal oscillators 61 and 62, which are the origin points of the drive pulses for the distributor 26. The period of each oscillator is determined by the circuit parameters and characteristics of the crystals in their respective feed-back circuits. The crystal associated with the oscillator 62 is selected so that this oscillator oscillates at a slower rate than the oscillator 61. More particularly, to generate a stop pulse that has a duration that is 42% greater than the duration of the start and intelligence impulses, the crystal associated with the oscillator 62 causes output pulses to be produced that are spaced apart in time by an amount that is 42% greater than the spacing of the output pulses produced by the oscillator 61.

Considering again the situation when the stop stage of the distributor 26 is rendered conductive, the drop in potential on the target 23 is impressed over a lead 63 to the control grid of a tube 64 thereby cutting off the tube. This tube and a tube 66 are interconnected to form a bistable multivibrator circuit so that when the tube 64 is shut off, the tube 66 is rendered conductive. The rise in anode potential of the tube 64, when it cuts off, is impressed over a lead 67 to a suppressor grid 68 of a pentode 69, thereby conditioning this pentode for operation, that is, permitting variations of voltage on its control grid to vary tube current. Simultaneously therewith, the drop in anode potential of the tube 66 is impressed over a lead 71 to a suppressor grid 72 of a second pentode 73 to hold this pentode from operation so that variations of voltage on its control grid have no effect. Pentodes 69 and 73 are connected as switch gates for passing the outputs of the oscillators 61 or 62 to a lead 74.

The output oscillations from the oscillator 62 are impressed on the grid of a cathode follower 76. Thereafter, outputs from the cathode of the tube 76 are impressed on a lead 77 running to a control grid 78 of the pentode 69. Since this pentode is conditioned for potential variations on its control grid 78, it now responds to the oscillations to impress an oscillating output over the lead 74 to a pair of differentiating capacitors 79 and 81 connected to control a bistable flip-flop circuit represented by the tubes 82 and 83. As each negative pulse is passed through the capacitor 79 or 81 the flip-flop circuit 82—83 responds and completes a circuit through voltage dividers to a source of negative potential to impress negative pulses over either a lead 84 or a lead 86. The leads 84 and 86 are connected, respectively, to control grids of a frequency divider, which in this instance is another magnetron-type beam switching distributor tube 87. The negative pulses appearing on the leads 84 and 86 are impressed on the control grids of the tube 87 to effectuate the successive stepping of the conductive path through the tube as described hereinbefore in the reference to the distributor tube 26.

The tube 87 steps through ten successive stages from left to right, and when the extreme right-hand stage is rendered conductive, the accompanying drop in spade potential is impressed over a lead 88 to a pair of differentiating capacitors 89 and 91. These capacitors are connected, respectively, to the control grids of a pair of tubes 92 and 93 that are interconnected to form another bistable flip-flop circuit. As each negative going pulse is impressed over the lead 88 the flip-flop circuit 92—93 is operated to impress a negative going pulse alternatively over a pair of leads 94 or 96. These leads are connected to the control grids of another magnetron-type beam switching distributor tube 97. The tube 97 has two functions one of which is to act as a frequency divider. When this tube has executed ten successive operations, the right-hand stage is rendered conductive, and as a result, the potential of the right-hand spade drops to impress a decreased potential condition over a lead 98.

The lead 98 is connected to a pair of differentiating capacitors 99 and 101 that are in turn connected to control a pair of tubes 102 and 103. Tubes 102 and 103 are interconnected to form a bistable flip-flop circuit that responds to negative drive pulses and, by association with voltage dividers connected to the anode circuits, produces negative pulses which are impressed on a pair of leads 104 and 106. The alternate negative pulses appearing on the leads 104 and 106 are used to effectuate the stepping of the conducting stage of another magnetron-type beam switching distributor tube 107. One of the functions of the tube 107 is to act as another frequency divider, and when this tube has stepped so that the extreme right-hand stage is conducting, the spade potential thereof will drop to impress a negative potential over a lead 108.

Each negative transition impressed on the lead 108 is passed through a pair of differentiating capacitors 109 and 111 to actuate another bistable flip-flop circuit consisting of the tubes 112 and 113. Negative going outputs from anodes of the tubes 112 and 113 are impressed over a pair of leads 114 and 116 to the control grids 28—28 and 27—27, respectively, of the signal impulse distributor tube 26. The tube 26 will advance from the extreme left-hand stop stage to the next succeeding start stage upon appearance of the first negative pulse over the lead 116, thereby terminating the duration of the stop impulse. It can be seen that each of the tubes 87, 97 and 107 steps through ten stages in order to step the distributor tube one step. Consequently, 1000 oscillations of either of the oscillators 61 or 62 steps the tube 26 through one stage, and accuracies of signal impulse length within 0.1% are thereby obtained.

When the stop stage of the tube 26 is cut off, the potential of the target 23 thereof rises to impress an increased potential condition over the lead 63 to again place the tube 64 in a conductive state. Tube 66 thereupon assumes a nonconductive state and the accompanying rise in anode potential is impressed over the lead 71 to the suppressor grid 72. Pentode 73 will thereafter respond to the oscillations produced by the oscillator 61. These oscillations are impressed on a cathode follower 121 and outputs are taken from the tube's cathode circuit. Thereafter, the oscillations are applied over a lead 122 to a control grid 123 of the pentode 72. Again, as in the operation of the pentode 69, the oscillatory output of the pentode 73 is taken from its anode and impressed over the lead 74 to drive the frequency divider tubes 87, 97 and 107 sequentially. The output from the frequency divider tube 107 is again utilized to step the operating stage of the signal impulse distributor tube 26. Inasmuch as the oscillator 62 is rendered effective only during the operation of the stop stage of the tube 26, then the duration of the operation of the start stage and the signal impulse stages are controlled by the outputs from the oscillator 61 and are of equal duration as described previously. The time of operation of the stop stage is 42% longer than the operation of the remaining stages, hence making it possible to generate a stop impulse, which is 42% longer than any other of the remaining signal impulses.

In order to generate a signal impulse with marking bias, when the number one signal impulse is marking, it is necessary that a marking condition be impressed on the output line 49 prior to the complete generation of a normal start impulse. This desirable feature is attained in the present invention by utilizing the output of certain stages of the frequency divider tubes 97 and 107 in conjunction with an anticipatory circuit, associated with the signal impulse distributor tube 26, to control the output mixer circuit 48 to initiate the space-to-mark transition of the first distorted signal impulse.

As described hereinabove with reference to the potential of the junction 32 prior to the generation of a stop pulse, prior to the time that the start stage of the distributor tube 26 is conducting, the potential at a junction point 124 is essentially that of ground potential. This condition exists since, at this time, the upper end of the diode 33 associated with the start stage is connected to the grounded target 23, and the lower end of the diode is connected through the resistor 34 associated therewith and the contact 15 to the negative potential 25. Consequently, the diode 33 conducts, and a circuit is completed from ground, through the resistor 24, the diode 33, the junction point 124, the resistor 34 and the contact 15 to the source of negative potential. Since the resistor 24 is very small with respect to the resistor 34, the junction point 124 will at this time, that is, prior to conduction of the start stage, be at ground potential. It will be noted that neither the diode 22 nor the resistor 21 is in the circuit to affect the voltage on the lead 36 during the conduction of the start stage of the tube 26. The reason is that the lead 36 should be positive so that the output potential of the tube 39 is negative. This negative potential would tend to impress the spacing condition that exists in the normal output during the start stage if it were not for the other circuitry.

When the second or start stage of the distributor tube 26 operates, the potential of the target 23 associated therewith drops, and this drop is designed to cut off the diode 33. The potential at junction point 124, therefore, drops to the value of the negative battery 25. This negative potential is reflected through a diode 125 and is impressed on a lead 126. It is important to note that the potential impressed on the lead 126 is dependent upon the next impulse to be generated. For example, during the conduction of the start stage of the distributor tube 26, the potential on the lead 126 is negative because the contact 15, which is associated with the number 1 impulse stage, is closed. This negative potential on the lead 126 is applied to the control grid of a normally-conducting amplifier 127. The amplifier 127, therefore, assumes a nonconductive state and its anode potential rises to render a voltage amplifier tube 128 conductive.

When the tube 128 conducts, there is a drop in its anode potential which causes a phase inverter tube 129 to assume a nonconductive state. Nonconduction of this tube is accompanied by a rise in anode potential, which is impressed over a lead 130, through the switch 10 (now in engagement with the contact "MB"), a diode 131 and a differentiating capacitor 132.

A positive voltage spike is developed by the capacitor 132 and is applied to the grid of a tube 133 to drive this tube into a state of conduction. This tube is in a circuit with a tube 134 and forms therewith a bistable multivibrator circuit so that the conducting tube 134 is rendered nonconductive. Upon the tube 133 assuming a conductive state, its anode potential drops to impress a decreased potential condition through a junction point 136 to the right side of a diode 137. Up to this time, the normally-conducting tube 134 had been holding the tube 133 cut off. The anode of the tube 133 was, therefore, at some positive potential that was applied to the junction point 136 and maintained the diode 137 conductive. Consequently, this positive voltage was applied to the grid of coincidence tube 138 to maintain the coincidence tube 138 conductive. Now, with the diode 137 cut off, other factors, to be now described, are capable of acting to cut off the coincidence tube 138.

The amount of distortion to be imparted to each signal impulse is determined by the setting of a pair of contactors 141 and 142 connected, respectively, to the targets of the frequency divider tubes 107 and 97. The contactor 141 is associated with two series of contacts marked in ten-percent divisions, whereas the contactor 142 is associated with two series of contacts designated by unit percentage divisions. In the illustrated example of the invention, the contactors 141 and 142 are set to impart a 11% marking bias since they engage, respectively, the lower tier contacts marked 10% and 1%. During the operation of the start stage in the distributor 26, the frequency divider tube 107 steps along until the ninth stage is operated, whereupon a drop in target potential is impressed through the contactor 141, through the switch 13 and through a resistor 143 to a junction point 144. This drop in potential is applied to the grid of the coincidence tube 138 to further reduce the grid potential, but a resistor 145 is so chosen that even this drop, in combination with the drop due to the cutting off of the diode 137 still results in a slightly positive potential on the grid of the coincidence tube 138 so that the tube is not cut off.

While the ninth stage of the frequency divider 107 is operating, the frequency divider 97 steps through a cycle of operation and when the ninth stage of this frequency divider is operated the accompanying drop in target potential is impressed through the contactor 142, through the switch 12 and through a resistor 146 to the junction point 144. Simultaneous appearance of the decreased potentials across the resistors 143 and 146 and due to the cutting off of the diode 137 at the junction point 144 causes the grid potential of the tube 138 to become negative and the coincidence tube 138 to be rendered nonconductive. The anode potential of the coincidence tube 138 thereupon rises to impress an increased potential condition through a diode 147, over a lead 148, through the switch 14 (in the "Bias" position) and over a lead 149 to the junction point 45.

The appearance of the simultaneous drop in potential at the junction point 144 is only of instantaneous duration due to the change in the conducting stage of the frequency divider 97. However, even this change in potential condition could not be effectively transferred to the output circuit, unless a delay were provided for the anode potential of the coincidence tube 138. This is apparent since the shutting off of the coincidence tube 138 results in a rise in the anode potential that will pass through a diode 150 to drive the tube 134 into its former conductive state, and thus tend to remove the conditioning potential from the grid of the coincidence tube 138. In order to hold the coincidence tube 138 cut off for a sufficient time to generate a relatively wide pulse (of about 10 microseconds), a time delay circuit for the grid is provided. This circuit consists of a capacitor 151 and a pair of resistors 152—152 associated with the junction point 136 so that when the grid potential of the coincidence tube 138 drops, this drop is maintained for a time determined by the time that the ninth stage of the tube 97 is conducting.

When the coincidence tube 138 is cut off, an increased potential condition is impressed through the diode 147, over the lead 148, through the switch 14 (now in the "Bias" position), over the lead 149 to the junction point 45 to effectuate the imposition of a space-to-mark transition on the output lead 49. Appearance of the increased potential condition at the junction point 45 also causes an operation of the output mixer circuit 48, so that the tube 47 is maintained in a conductive condition. Since the tube 47 is so maintained, the restoration of conductivity to the coincidence tube 138 has no effect on the marking condition being applied to the lead 49.

When the start stage of the distributor tube 26 is shut off and the next stage of the tube (number 1 impulse stage) is rendered conductive, the drop in target potential causes the diode 22 associated therewith to be cut off and the negative battery source 25, acting through the contact 15, causes a reduced potential to be impressed on the lead 36 so that the tube 37 is shut off, the tube 38 is rendered conductive and the tube 39 is shut off. The accompanying rise in anode potential of the tube 39 is impressed over the lead 41, through the capacitor 43, through the switch 11, whereafter the diode 44 blocks the pulse, as previously described. The marking condition will thus be maintained on the output lead 49 during the entire period that the number 1 impulse stage of the distributor 26 is operating.

When the number 1 impulse stage of the tube 26 is shut off and the number 2 impulse stage is rendered operative, the potential on the lead 36 will rise due to the now-open contact 16. The tube 37 thereupon conducts and, as a result thereof the tube 38 is rendered nonconductive and the tube 39 is rendered conductive. The drop in anode potential of the tube 39 is reflected over the lead 41 and through the differentiating capacitor 43 and the diode 44 to the junction point 45. This drop is effective to cut off the tube 47 and operate the mixer circuit 48 to maintain the cut off condition of the tube 47. Nonconduction of the tube 47 results in a no-current or spacing condition being applied on the lead 49. This condition is indicative of the number 2 intelligence impulse, which is spacing or no-current impulse.

Figure 6:
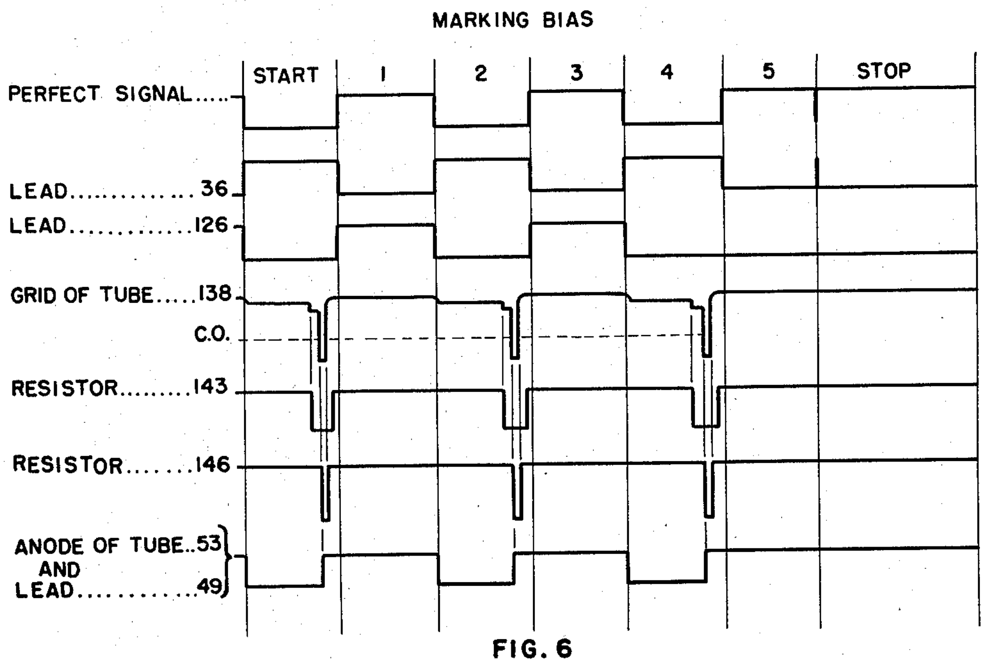

To summarize the operation of the signal generator when producing signal impulses characterized by 11% making bias, refer to Fig. 6 wherein the potential conditions on various components are shown during the generation of a complete signal. It will be appreciated that, as the signal impulse distributor tube 26 executes a cycle of operation, potential conditions will be impressed on the lead 36 (line 36 in Fig. 6) indicative of the inverse of a theoretically-perfect signal. Line 126 of Fig. 6 represents the signal conditions on the lead 126, and it will be noted that as the signal impulse distributor tube 26 executes a cycle of operation, potential conditions are impressed on the lead 126 that are representative of the inverse of the signal impulses next to be generated. Impression of a negative going potential on the lead 126 due to a space-to-mark transition requirement in the next pulse of the output signal, causes a resultant operation of the bistable multivibrator 133—134 to condition the grid of coincidence tube 138 (see line 138 of Fig. 6) for cut off by further negative pulses.

When the frequency divider tube 107 has stepped through nine stages, the potential applied through resistor 143 (see line 143 of Fig. 6) drops. Now, when frequency divider tube 97 steps through nine stages, during operation of the ninth stage of frequency divider tube 107, the potential applied through the resistor 146 (see line 146) drops. As a result of the conjoint application of reduced potentials applied through the resistors 143 and 146, the potential at junction point 144 becomes negative. The cooperative effect of the conditioning of the coincidence tube 138, in conjunction with the reduced potentials applied to the junction point 144, causes the coincidence tube 138 to shut off. Immediately thereupon, the anode potential rises to impress a positive-going pulse to operate the tube 47 and impress a marking condition on the output line 49. This marking condition is maintained on the output line 49 in this manner by the output mixer 48 until the number 1 stage of the distributor tube 26 operates. This output marking condition is terminated when there is an increased potential condition impressed on the lead 36, which condition only occurs when a tape reader controlled contact, 15 to 19, inclusive, is open during the operation of the associated stage in the distributor. The lower line of Fig. 6 indicates the potential condition of the anode of the tube 53, and since this anode potential controls the application of potential conditions to the output line 49, this line is also indicative of the generated signal having marking bias applied to the output lead 49.

*Spacing bias*

Consider now the situation where it is desired to generate signals characterized by spacing bias, that is, signals wherein the space-to-mark transition is retarded from normal. The switches 11 and 14 are maintained in the "Bias" position, whereas the switch 10 is moved to the "SB" position and the switches 12 and 13 are moved to their "SB-MED" positions. The distributor tube 26 is again driven by the oscillator 62 through the stop stage and the oscillator 61 drives the distributor tube 26 through the start stage and the five signal impulse stages. Each oscillator pulse is again utilized to drive the frequency dividers 87, 97 and 107 in the manner explained hereinbefore.

As the distributor tube 26 is driven through the start stage, the lead 36 (see Fig. 7) has an increased potential applied thereto, and as a result, the tube 37 is rendered conductive, the tube 38 is rendered nonconductive and the tube 39 is rendered conductive. The resultant drop in anode potential of tube 39 is impressed over the lead 41 and through the differentiating capacitor 43. The resulting differentiated negative pulse is reflected through the switch 11 and the diode 44 to the junction point 45, where the drop in potential causes the shutting off of the tube 47 and, consequently, a spacing condition on the output line 49. In the output mixer circuit 48, the tube 52 is shut off and the tube 53 is placed in a conductive state to maintain the tube 47 cut off. When the number 1 signal impulse stage of the distributor 26 is operated and the tape reading contact 15 is closed, there is a resultant drop in potential on the lead 36 to cut off the tube 37, to start the tube 38 conducting and to cut off the tube 39. The accompanying rise in anode potential of tube 39 is applied over lead 41 and through the capacitor 43, but the diode 44 precludes passage of the pulse to the junction point 45. The spacing condition is thus maintained on the output line 49 despite the fact that the sensing contact 15 is positioned in accordance with a perforation in the tape which normally would result in a marking condition being impressed on the output line 49.

When the tube 39 is rendered nonconductive at the time of operation of the number 1 impulse stage of the distributor 26, the accompanying rise in anode potential is impressed over a lead 153, through the switch 10 (now engaging the SB contact), through the differentiating capacitor 132, to operate the tube 133. Operation of this tube is followed by the rendering of the tube 134 nonconductive and the impression of a reduced conditioning potential at the junction point 136. The diode 137 thereupon ceases conduction, and the positive potential hitherto being applied to the grid of the coincidence tube 138 is cut off. The grid of the coincidence tube 138 is thereby conditioned to be cut off when negative pulses are applied through both of the resistors 143 and 146.

In order to select the percentage of spacing distortion to be imparted to the signal impulses, the contacts 141 and 142 are moved so that the upper tier of contacts are engaged at the desired combination of percentage indications. For instance, if it is desired to generate a signal with 11% spacing bias, then the contactor 41 is moved to engage the upper contact marked "10%" (associated in the stage number 1 of the tube 107) and the contactor 142 is moved to engage the upper contact marked "1%" (associated with stage number 1 of the tube 97).

Now, as the number 1 impulse stage of the distributor tube 26 is operating, the oscillator 61 is driving the frequency dividers 87, 97 and 107. When the first stage of the frequency divider tube 107 is operated, a conditioning drop in potential is impressed on the resistor 143 (shown in Fig. 7 by line 143). During the operation of first stage of the frequency divider 107, the frequency divider 97 will execute a cycle of operation and, when the number 1 stage is operated, a decreased potential condition is impressed on the resistor 146 (see line 146 of Fig. 7). As a result of the joint applications of reduced potentials to the resistors 143 and 146, there is a reduction of the potential at the junction point 144. Recalling that this junction point is connected to the now-conditioned grid of the coincidence tube 138, it is apparent that a further drop in grid potential causes the coincidence tube 138 to be driven into a state of nonconduction.

Figure 7:
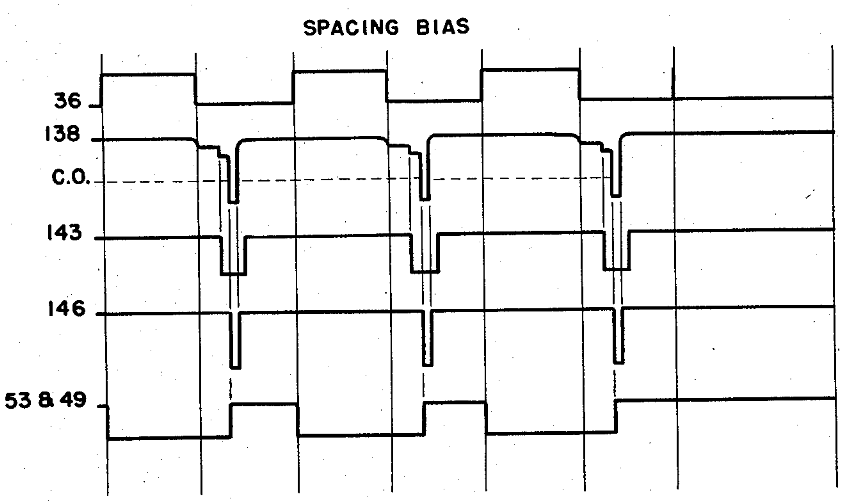

When the coincidence tube 138 is cut off, its anode potential rises to impress a positive going pulse through the diode 147. The positive pulse is also impressed through the lead 148 and the switch 14 (now in its "Bias" position) to start the tube 47 conducting and to effectuate the operation of the output mixer 48 to maintain conductive the tube 47. The tube 52 is rendered conductive and tube 53 is rendered nonconductive to hold the tube 47 in a conductive condition. Conduction of the tube 47 establishes the space-to-mark transition on the output line 49. It will be noted that this transition occurred after the operation of the number 1 impulse stage of the distributor tube 29. The amount of delay was determined by the time elapsed between the operation of the first stage of the frequency divider tube 107 and the operation of the first stage of this tube, plus the time required to advance the operative stage of the frequency divider tube 97 from the tenth to the first stage. In Fig. 7, the condition of the anode potential of the tube 53 is shown and is designated by the line 53. The variation in potential on this anode is proportional to the signal impulse conditions impressed on the output line 49.

*Spacing end distortion*

In order to generate signals characterized by spacing end distortion, the switches 12 and 13 are moved to their "MB-SED" contacts, the switches 11 and 14 are moved to their "ED" (end distortion) positions and the switch 10 is moved to its "SED" position. In addition, a switch 154 associated with the stop stage of the distributor tube 26 is moved to its closed "ED" position. When the stop stage of the distributor tube 26 is operated, the resulting drop in target potential is effective to cause a drop in potential on the lead 36 as described hereinbefore. Thereupon, the tubes 37 and 39 are rendered nonconductive and the tube 38 is placed in a conductive condition. The accompanying rise in anode potential of the tube 39 is impressed over the lead 41 and through the differentiating capacitor 43 to the switch 11, however, from there, the increased potential now passes through a diode 155 to the junction point 45 to render the tube 47 conductive and operate the output mixer circuit 48 so that the tube 53 will now maintain the tube 47 in its conductive state.

Since the switch 154 is now closed, operation of the stop stage in the distributor tube 26 is also effective to impress a decreased potential condition through a diode 157 and over the lead 126 to the grid circuit of the tube 127. The tube 127 thereupon shuts off, and, as a result, the tube 128 is placed in a conductive condition. The resultant drop in anode potential of tube 128 is impressed over a lead 158 and through the switch 10 (now in its "SED" position) to the diode 131 wherein it is blocked. When the start stage of the distributor 26 operates, there is a rise in potential impressed on the lead 36, which in conjunction with the tubes 37 to 39, inclusive, is effective to impress a decreased potential condition over the lead 41 to the diode 155, wherein it is blocked.

However, when the start stage is operated, the resultant drop in spade potential is impressed over the lead 54 and through the diode 56 to the junction point 45, whereafter the pulse is effective to operate the output mixer circuit 48 so that the tube 52 is shut off and the tube 53 is conducting. The tube 47 is thereby placed in a nonconductive state to impart a no-current or spacing condition on the output line 49. This spacing, no-current or start condition is maintained on the output line 49 until the number 1 impulse stage of the distributor is operated. The purpose of assuring that a spacing or no-current condition exists on the output line 49 is to prevent any type of end distortion from being applied to the start impulse. When the number 1 stage of the tube 26 is operated, the resultant drop in target potential renders the tube 37 nonconductive, the tube 38 conductive and the tube 39 nonconductive. Again, the rise in anode potential of tube 39 is impressed over the lead 41 and through the diode 155 to the junction point 45, as discussed hereinbefore. An increase in potential at the junction point 45 causes an operation of the tube 47 to place a marking condition on the output line 49, which condition is maintained by the operation of the output mixer circuit 48.

When the number 1 impulse stage of the distributor tube 26 is operated, with the contact 16 open, there is a potential rise imparted on the lead 126 that is effective to render the tube 127 conductive and the tube 128 nonconductive. Note again that the potential on the lead 126 during the generation of the number 1 stage of the tube 26 depends upon what number 2 impulse is to be. When the tube 128 is rendered nonconductive, an increased potential condition is impressed over the lead 158, through switch 10, through the diode 131 and through the differentiating capacitor 132, to cause an operation of the flip-flop circuit 133—134. Tube 133 is thereupon placed in a conductive condition, and the resulting drop in anode potential thereof is impressed on the junction point 136. Appearance of the decreased potential condition at junction point 136 causes the diode 137 to be rendered nonconductive so that the grid of the coincidence tube 138 is conditioned for conduction as described hereinbefore.

In order to impart 11% spacing end distortion to the generated signals, the contactor 141 is moved to engage the lower tier contact marked "10%", and the contactor 142 is moved to engage the lower tier contact marked "1%." When the frequency divider tube 107 has stepped so that the ninth stage is operating, the accompanying drop in target potential is impressed through the contactor 141, through the switch 13 (now in its "MB-SED" position) and through the resistor 143 to the junction point 144. When the ninth stage of the frequency divider tube 97 operates, the resulting drop in target potential is impressed through the contactor 142, through the switch 12 (now in its "MB-SED" position) and through the resistor 146, to the junction point 144.

Simultaneous application of decreased potential conditions at the junction point 144 results in the application of a negative pulse to the now-conditioned grid of the coincidence tube 38. This tube thereupon assumes a nonconductive condition, and the accompanying rise in anode potential is impressed through the diode 147, over the lead 148, through the switch 14 (now in the "ED" position) to the grid of the now nonconducting tube 33. The tube 53 thereupon conducts, and the tube 52 is driven into a state of nonconduction. The accompanying drop in anode potential of tube 53 is impressed through the junction point 45 to the grid of the tube 47. This tube is thereby placed in a nonconductive condition to terminate the marking condition on the line 49. It will be appreciated that the marking condition is terminated on the line 49 prior to the initiation of the operation of the number 2 impulse stage of the frequency divider. Consequently, the resulting signal impulse is characterized by spacing end distortion, and in this example, by 11% spacing end distortion.

The distributor tube 26 will step along, and when the number 3 impulse stage is operated, a marking condition will be impressed on the output line 49. This condition will be terminated prior to the operation of the number 4 impulse stage of the distributor 26 in a manner similar to the number 1 impulse being terminated prior to the operation of the number 2 impulse stage of the distributor 26. When the number 5 impulse stage of the distributor 26 is operated, a marking condition will be impressed on the lead 49. This marking impulse, however, will not be terminated prior to the operation of the stop stage of the distributor with a switch 159 positioned as shown in Fig. 3. Under this condition, as soon as the number 5 impulse stage is operated, the diode 33 associated therewith stops conducting and a decreased potential condition is impressed through the diode 157 associated with the number five impulse stage, to the lead 126. This decreased potential condition is effective in rendering the tube 127 nonconductive and tube 128 conductive. Conduction of the tube 128 causes a decreased potential condition to appear on the lead 158, which condition is blocked by the diode 131. Consequently, the bistable multivibrator 133—134 is not operated. There is no conditioning potential imparted to the grid of the coincidence tube 138 so that operation of the ninth stages of the frequency dividers 97 and 107, during the generation of the fifth signal impulse, is ineffective to change the state of the output mixer circuit 48. It will be understood then that the number 5 signal impulse is not characterized by spacing end distortion, whereas the number 1 and number 3 signal impulses are so characterized.

Figure 8:
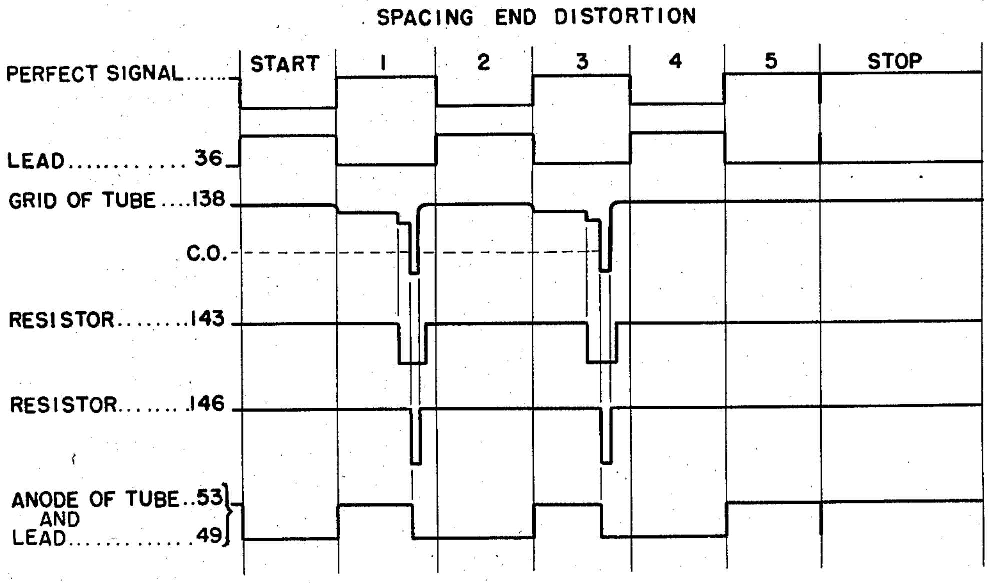

Referring to Fig. 8, there are shown the various critical potentials that must be produced to generate signals characterized by spacing end distortion. It will be noted that as the distributor 26 steps along, each ascertained marking condition will impress a reduced potential condition to the lead 36 so that a marking condition is applied directly to the output lead 49. When a spacing condition is to be next generated, the bistable multivibrator 133—134 under control of potential changes on lead 126, causes a conditioning potential to be applied to the grid of the coincidence tube 138 (see line 138 of Fig. 8). During the impression of the marking signal impulse on the output line 49, the distributors 97 and 107 step along and upon a coincident operation of the two selected stages (selected by positioning of contactors 141 and 142) reduced potentials are applied through resistors 143 and 146 (see lines 143 and 146 of Fig. 8) so that the potential on the grid of the coincidence tube 138 is further reduced sharply. The output anode potential thereupon rises sharply, and the output mixer is operated so that the tube 53 conducts and tube 52 is rendered nonconductive. The line 53 of Fig. 8 represents the anode potential of tube 53 and is proportional to the signal conditions applied to the output line 49.

*Marking end distortion*

When it is desired to generate signals characterized by marking end distortion, the switches 12 and 13 are moved to their "SB-MED" positions, the switch 10 is moved to its "MED" position, and the switches 11, 14 and 154 are maintained in their "ED" positions. In this instance, when a stage of the distributor tube 26 is operated and the associated one of the contacts 15 to 19, inclusive, of the tape reader is closed, a marking condition is impressed on the output line 49. This occurs as a result of the drop in potential on the lead 36 which turns the tubes 37 and 39 off and the tube 38 on, thereby causing a rise in potential to be impressed over the lead 41, through the capacitor 43, through the contact 11 and through the diode 155 to the junction point 45. Appearance of the increased potential at the junction point 45 again causes the tube 47 to conduct and the output mixer 48 to operate to hold the tube 47 in a conductive state.

Figure 9:
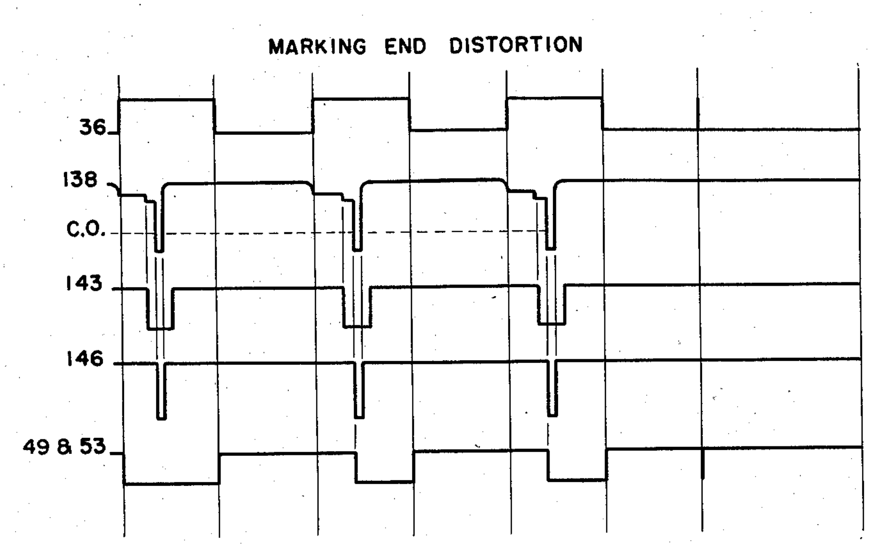

In the illustrated example in Figs. 1 to 4, inclusive, and in Fig. 9, the first intelligence impulse is a marking impulse and the second is a spacing impulse. Thus, to obtain marking end distortion, it is necessary to delay the normal mark-to-space transition until some preselected time during the operation of the number 2 stage of the signal impulse distributor tube 26. This action is accomplished by rendering the coincidence tube 138 nonresponsive to outputs from the distributor tubes 97 and 107 during the operation of the number 1 impulse stage of the distributor tube 26, and by conditioning the coincidence tube 138 for operation during operation of the number 2 impulse stage of the distributor.

More particularly, during the impression of the marking impulse on the output line 49, the tube 38 is conducting, and a reduced potential condition is impressed over a lead 160 and through the switch 10 (in the "MED" position) to the diode 131, where it is blocked. Consequently, the bistable multivibrator 133—134 is not operated to condition the coincidence tube 138. However, when the distributor tube 26 is stepped so that the number 2 impulse stage is operated, the tubes 37 and 39 are placed in a conductive condition and the tube 38 is rendered nonconductive. Conduction of the tube 39 is ineffective to change the signal condition on the output lead 49 because the resulting drop in anode potential is blocked by the diode 155.

The rendering of the tube 38 nonconductive causes an increased potential condition to be impressed on the lead 160, and through the switch 10 (now on the "MED" position) and the diode 131. The increased potential impressed through the diode 131 is differentiated by the capacitor 132 and a positive voltage spike is thereafter applied to operate the bistable multivibrator 133—134. Conduction of tube 133 again renders the diode 137 nonconductive and conditions the grid of the coincidence tube 138.

Assuming that 11% marking end distortion is to be imparted to the generated signals, the contactor 141 is moved to engage the contact marked "10%" in the upper tier of associated contacts, and the contactor 142 is moved to engage the contact marked "1%" in the upper tier of associated contacts. Now, during the operation of the number 2 impulse stage of the distributor tube 26, the operation of the number 1 stage of he frequency divider tube 107 causes a first conditioning potential to be applied to the junction point 144. When, during the operation of this stage of the tube 107, the number 1 stage of the frequency divider tube 97 operates, then a second reduced conditioning potential is applied to junction point 144. Simultaneous appearance of the reduced potentials at the junction point 144 causes a further drop in grid potential of the coincidence tube 138. This added drop causes the coincidence tube 138 to be cut off, and, as a result, a rise in anode potential is applied through the diode 147, over the lead 148, and through the switch 14 (now in ED position) to the grid of the tube 53. Appearance of this increased potential on the grid of the tube 53 causes conduction of this tube, its anode potential drops, and this drop is impressed through the junction 45 to the grid of the tube 47 causing the tube 47 to assume a nonconducting condition. Consequently, a mark-to-space transition is applied to the output line 49.

Referring to Fig. 9, there is shown the critical potential conditions on the various component elements of the signal generator for generating signals characterized by marking end distortion. It will be noted that each drop in potential on lead 36, effectuates an operation of the output mixer circuit 48 to place a marking impulse on the output line 49. The line marked 53 in Fig. 9 represents the condition of the anode of tube 53, and the conditions assumed by this anode are indicative of the generated start-stop signals impressed on the output lead 49. When the number 1 impulse, for example, is to be generated, the lead 36 has a negative potential thereon during the entire time that the number 1 impulse stage of the tube 26 is operated. Ordinarily, if no distortion were to be generated, the output lead 49 would have a marking pulse thereon during this time only since, when the number 2 impulse stage of the tube 26 operates, the potential on the lead 36 rises to drop the anode potential of the tube 39 and cut off the tube 47. However, at this time, the anode potential of the tube 38 rises to cut off the diode 137 and condition the grid of the coincidence tube 138. As a consequence, the coincidence tube 138 will cut off during the time that the first stages of the tubes 107 and 97 are operating. Under these conditions, the coincidence tube 138 will be cut off, and a marking pulse will be maintained on the output lead 49 for such a time during the operation of the number 2 stage of the tube 26 that the output signal on the lead 49 is characterized by 11% marking end distortion.

In each of the examples of distorted signals so far described, it has been assumed that five unit Baudot code was to be generated. In each case, seven stages of the distributor tube 26 are utilized in actually impressing the desired signal on the output lead 49. After the fifth or last impulse of each character is generated, the eighth stage of the distributor tube is rendered conductive, that is, the electron beam is established between the eighth target 23 and the cathode 29 in the tube 26. When the eighth stage of the tube 26 is rendered conductive, a negative voltage is impressed on a lead 163, through a contact 164 and a switch 165 (in the position shown in Fig. 3), and over a lead 168 to the spade 31 in the stop stage of the tube 26. A negative voltage being applied to the spade of one of the stages results in the transferral of the conductive beam to the target of that stage in a similar manner as the application of negative potentials to the grids 27—27 and 28—28. Consequently, the electron beam is switched from the eighth stage of the tube 26 to the first or stop stage thereof.

If it is desired to generate signals of a six unit code, an additional sensing contact 169 is used in addition to the contacts 15 to 19, inclusive. In this case, the switch 159 is moved from the position shown in Fig. 3 and is placed in contact with a contact 170 so that the sixth impulse can be sensed during the generation of the fifth impulse. At this time, a switch 173 is connected to a contact 174 so that nine stages of the tube 26 are used, and the switch 165 is placed in contact with a contact 175 to switch conduction back to the stop stage immediately after the ninth stage has conducted.

In a similar manner, when a seven unit code signal is to be generated, a seventh sensing contact 178 is utilized. The switch 159 is positioned adjacent to the contact 170, the switch 173 is placed in contact with a contact 179 and the switch 165 is connected to a contact 180. In this case, all ten stages of the distributor tube 26 will be rendered conductive successively and the last stage thereof will cause the application of a negative pulse over the lead 168 to trigger the stop stage of the tube 26. Also, the switches 159 and 173 are in their correct positions so that the contacts 169 and 178 are sensed during the conduction of the stages of the tube 26 preceding the stages in which they are connected.

It is to be understood that the above-described arrangements of elements and selection of components are simply illustrative of an application of the principles of the invention. Many other modifications may be made without departing from the spirit and scope of the invention.

What is claimed is:

1. A distortion signal generator which comprises a first network for sensing a first portion of a signal to be generated, a second network for sensing a succeeding portion of the signal to be generated after the first portion, counter means, and means actuated by a predetermined one of the outputs of the networks and the counter means output for introducing a predetermined distortion in the first portion.

2. A signal generator for introducing distortion in a signal, which comprises signal-originating means producing two potential conditions indicative of the signal to be generated, counting means, and means actuated by an output of one or the other of the two potential conditions and an output of the counting means for applying distortion to the generated signal.

3. A signal generator for introducing distortion into a signal having a plurality of impulses, which comprises means for sensing a first signal impulse, means for sensing a succeeding signal impulse, a plurality of counter circuits, and means actuated by an output from the sensing means and a predetermined number of outputs from the counter circuits for introducing a predetermined distortion in the first impulse.

4. A distortion signal generator which comprises signal-originating means, a first circuit for sensing the condition of a first part of the signal, a second circuit for sensing the condition of a part of the signal following the first part, an electronic counting means, and a coincidence circuit actuated by one output from the sensing circuits and the counting means output for introducing a predetermined distortion in the first part of the signal.

5. A distortion signal generator which comprises means for originating a signal having a plurality of impulses, an output circuit, means for sensing one of the impulses and applying it to the output circuit, means for sensing a succeeding impulse at the same time that the first impulse is being sensed, a coincidence circuit, a counting circuit, means for applying one of the outputs from the impulse-sensing means and an output of the counting circuit to the coincidence circuit, and means connecting the output of the coincidence circuit to the output circuit to produce a predetermined distortion in the impulse-sensing-means output applied thereto.

6. A signal generator for introducing distortion in a telegraph signal having a plurality of impulses, which comprises signal-originating means producing two potential conditions indicative of the signal impulses to be generated, a mixer circuit, means for applying one output of the signal-originating means to the mixer circuit, a counter circuit having a plurality of outputs, a coincidence circuit, means for applying a predetermined one of the potential conditions of the originating means and a predetermined plurality of outputs from the counter circuit to the coincidence circuit, and means for applying an output from the coincidence circuit to the mixer circuit.

7. An apparatus for introducing distortion in the outputs of a plurality of sources of telegraph signal impulses and impressing them on a single transmission line, which comprises a first circuit capable of being responsive to one of the signal impulse sources, a second circuit capable of being responsive to a succeeding one of the signal impulse sources at the time that the first circuit is responsive to its associated source, an output circuit connected to the transmission line, means for applying the output from the first circuit to the output circuit, an oscillator-driven counter circuit having a plurality of outputs one of which causes the first and second circuits to be responsive to their respective signal impulse sources, a coincidence circuit, means for applying an output from the first and second circuits and a predetermined number of outputs from the counting circuit to the coincidence circuit, and means for applying the coincidence circuit output to the output circuit to place a predetermined distortion on the first signal impulse impressed on the transmission line.

8. A signal generator for impressing distorted signal impulses on a transmission line, which comprises a pair of sensing means, means for conditioning a first of the sensing means with marking and spacing potentials indicative of a distortionless version of a signal impulse to be generated, means for conditioning the second of the sensing means with marking and spacing potentials indicative of a distortionless version of the next-succeeding signal impulse to be generated, a mixer circuit having an output connected to the transmission line, means for applying an output from the first sensing means to the mixer circuit, a coincidence circuit, a counter circuit, means for applying a predetermined output from the sensing means and a predetermined number of outputs from the counting circuit to the coincidence circuit, and means for connecting an output from the coincidence circuit to the mixer circuit.

9. A signal generator for introducing distortion into a signal having a plurality of impulses and impressing the distorted signal on a transmission line, which comprises a pair of sensing circuits, means for conditioning a first of the sensing circuits with marking and spacing potentials indicative of one signal impulse and the second sensing circuit with such potentials indicative of the next-succeeding signal impulse, a plurality of counter circuits, a distributor actuated by the counter circuits, oscillator means for driving the counter circuits so that the conditioned sensing means are operated successively, a mixer circuit connected to the transmission line, means for applying an output from the first sensing circuit to the mixer circuit, a coincidence circuit, means for applying a predetermined one of the outputs of the sensing circuits to the coincidence circuit depending on the type of distortion to be applied to the signal, means for applying a predetermined number of outputs from the counter circuit to the coincidence circuit depending upon the amount of distortion to be applied to the signal, and means for applying an output indicative of the type and amount of distortion to be applied to the signal from the coincidence circuit to the mixer circuit.

10. A signal generator for introducing distortion in the outputs of multi-wire sources of telegraph signals and impressing them on a single transmission line, which comprises a first series of gating means, means for conditioning the first series of gating means in accordance with the marking and spacing signal impulse conditions to be transmitted, a second series of gating means, means for conditioning the second series of gating means with marking and spacing signal impulse conditions next to be transmitted, a multi-stage distributor having each stage designed to operate one gating means in each series of gating means, a plurality of counter circuits, oscillator means for driving the counter means and the distributor such that the distributor stages are operated successively with respect to the signals, a binary circuit means for controlling the impression of signal conditions on the transmission line, means for applying an output from the first series of gating means to the binary circuit, a coincidence circuit, means for applying a predetermined one of the outputs of the two gating means and a predetermined number of outputs from the counter circuits to the coincidence circuits, and means connecting the coincidence circuit output to the binary circuit to apply a predetermined type and amount of distortion to the signal being impressed on the transmission line.

11. An apparatus for introducing distortion in the outputs of multi-wire sources of telegraph intelligence signals and impressing them on a single transmission line, which comprises a distributor having a plurality of stages capable of being rendered conductive with each of the stages connected to an associated one of the signal sources, a plurality of counter circuits, electronic oscillator means for driving the counter circuits and the distributor such that the distributor stages are rendered conductive successively at predetermined intervals, a mixer circuit having the output thereof connected to the single transmission line, a first sensing circuit having a plurality of outputs and connected to outputs of the distributor stages and the sources of intelligence signals for sensing the signals successively as the stages of the distributor are rendered conductive and for applying one output therefrom to the mixer circuit, a second sensing circuit connected to the distributor stage outputs and the next succeeding sources of intelligence signals following the sources to which the first sensing circuit is connected for sensing the signals next succeeding those sensed by the first sensing circuit, a coincidence circuit, means for applying a predetermined one of the outputs from the first and second sensing circuit to the coincidence circuit depending on the type of distortion to be applied to the intelligence signals on the single transmission line, means for applying a predetermined number of outputs from the counter circuits to the coincidence circuit depending upon the amount of distortion to be applied to the signals on the transmission line, and means for applying the output of the coincidence circuit to the mixer circuit.

12. An apparatus for introducing distortion in the outputs of multi-wire sources of telegraph signals and impressing them on a single transmission line, which comprises a distributor having a plurality of stages capable of being rendered conductive, counter circuits having a plurality of output points, oscillator means for operating the counter circuits and the distributor such that the distributor stages are rendered conductive successively at predetermined intervals, a first sensing circuit including a first plurality of diode sensing networks having a single output wherein each of the networks is connected to an associated one of the distributor stages and to an associated one of the signal sources to sense the signal sources in synchronism with the successive conduction of the distributor stages, a second sensing circuit having a single output including a second plurality of diode sensing networks wherein the networks are connected to distributor stages similarly as the first plurality of networks and wherein each network is connected to an associated one of the next-succeeding signal sources with respect to the first plurality of networks to anticipate the condition of the next-succeeding signal source during the successive conduction of the distributor stages, a first amplifier and inverter stage connected to the output of the first plurality of diode sensing networks for developing therein a pair of output voltages with one similar to a distortionless version of the signals in synchronism with the distributor stages and the other being the inverse of such voltage, a second amplifier and inverter stage connected to the output of the second plurality of diode sensing networks for developing therein a pair of output voltages with one similar to a distortionless version of the signals to be next impressed on the transmission line and the other being the inverse of such voltage, a mixer circuit having an output thereof connected to the single transmission line, means for applying the output similar to a distortionless version of the signal in synchronism with the distributor stage to the mixer circuit, a coincidence circuit, first switching means for applying a predetermined one of the outputs from the amplifier and inverter circuits to the coincidence circuit depending upon the type of distortion to be applied to the signal to be impressed on the transmission line, second switching means for applying a predetermined number of outputs from the counter circuit to the coincidence circuit depending upon the amount of distortion to be applied to the signal on the transmission line, and means for applying an output of the coincidence circuit to the mixer circuit.

References Cited in the file of this patent

UNITED STATES PATENTS

| | | |
|---|---|---|
| 2,522,739 | Bayard et al. | Sept. 19, 1950 |
| 2,568,019 | Martin | Sept. 18, 1951 |
| 2,611,824 | Van Dauren | Sept. 23, 1952 |
| 2,644,037 | Beaufoy | June 30, 1953 |
| 2,685,613 | Liguori | Aug. 3, 1954 |
| 2,705,261 | Canfora et al. | Mar. 29, 1955 |